United States Patent [19]

Yoshikawa et al.

[11] 4,279,494
[45] Jul. 21, 1981

[54] CAMERA BODY

[75] Inventors: Ryoichi Yoshikawa, Yokohama; Kazuhiko Okajima, Fukushima; Shunichi Nakahara, Tokyo; Sumio Nakayama, Kawasaki, all of Japan

[73] Assignee: Canon Kabushiki Kaisha, Tokyo, Japan

[21] Appl. No.: 97,834

[22] Filed: Nov. 26, 1979

[30] Foreign Application Priority Data

Nov. 25, 1978 [JP] Japan ................................ 53-145536

[51] Int. Cl.³ ............................................. G03B 17/02
[52] U.S. Cl. .................................................... 354/288
[58] Field of Search .................................. 354/203, 288

[56] References Cited

U.S. PATENT DOCUMENTS

| 2,320,423 | 6/1943 | Githens et al. | 354/288 |
| 2,378,406 | 6/1945 | Harris | 354/288 X |
| 4,067,032 | 1/1978 | Yoshikawa et al. | 354/288 |
| 4,068,248 | 1/1978 | Pizzuti et al. | 354/288 |
| 4,152,065 | 5/1979 | Kobori | 354/288 |

Primary Examiner—Donald A. Griffin

[57] ABSTRACT

A camera body includes a plastic body formed by molding and having a central portion with film loading and windup chambers at its opposite ends. A reinforcing metal bracket or plate is positioned in and forms a part of the central portion, the plate having at least one connecting portion which interengages the molded plastic body. The plate has a thickness substantially equal to that of the central body portion, and its connecting portions have projections for contacting a molding surface in the mold used to form the camera body in response to molding pressure applied to the projections. The projections prevent seepage of molten plastic between the plate and the molding surface, thereby preventing plastic flash from appearing at the connecting portion of the plate with the plastic body.

6 Claims, 6 Drawing Figures

CAMERA BODY

BACKGROUND OF THE INVENTION

The present invention relates generally to camera bodies, and particularly to a camera body formed of plastic with a reinforcing metal plate inserted therein.

Recently, it has been considered to form a camera body of plastic in order to cut down on the weight and the price of the camera. However, such construction poses problems in maintaining dimensional stability and strength.

Specifically, since the distance betweeen the plane of the camera film guide rail and the plane of the seat of the lens mount or "flange back" is a predetermined value, it is necessary that a plastic camera body have sufficient strength for accurately maintaining the position of the flange back relative to the film guide rail. However, when the camera body is formed of plastic, it is often impossible to provide the plastic body with sufficient thickness to meet this strength requirement.

Particularly in the case of a single lens reflex camera, when the thickness of its aperture portion is increased for strengthening purposes, the camera as a whole becomes quite large, contrary to the intended purpose of realizing a compact and lightweight camera. In fact, it is often impossible to provide the plastic body of sufficient thickness.

As a result, it has been proposed in U.S. Pat. No. 4,067,032 that the part whose strength must be maintained, namely, the part having the aperture therein, which determines the picture size and the plane of the film guide rail, be made separately of metal, while other parts are formed of plastic in order to guarantee sufficient strength of the camera body. In accordance with U.S. Pat No. 4,067,032, accurate positioning of the flange back is ensured by connecting a metal bracket or plate inserted in the camera body directly with a metal front plate unit extending in the plane of the lens mount.

When a metal plate is inserted into a camera body formed of plastic, the metal plate must necessarily have a connecting portion for interengaging the plastic. The metal plate is usually bent several times in alternate directions for the sake of appearance, light blockage and strength, while the connecting portion, which is located in the vicinity of the film spool chambers, becomes visible only when the user opens the back cover. Any plastic flash or gaps formed at the connecting portion of the plate are thereby maintained normally out of sight. To eliminate unsightly plastic flash, gaps, and the like where the metal plate is connected with the plastic body, it will be understood that it is essential to eliminate any clearance between the metal plate and the molds which are used to mold the camera body by keeping the dimensional tolerances of the metal plate and the molds as high as possible.

However, it is extremely difficult to maintain tolerances of a metal plate consisting of, for example, die cast aluminum, within ±0.1 mm, when a large number of molds for the metal plates and a large number of molds for the entire camera body are used in large scale production. It is also difficult to check continually for the above-mentioned clearance when the molds for the metal plate are interchanged among each other and the molds for the camera body are also interchanged among each other. Consequently, it is difficult, if not impossible, to guard against this clearance so that molten plastic does not flow or seep into the clearance when the camera body is molded. When such clearance exists, the molten plastic will seep into it and thereby form plastic flash on the surface of the finished camera body.

Further, during the molding of a camera body of plastic with a metal plate inserted in the plastic, there is the danger that a gap will form at the connecting portion of the metal plate with the plastic body due to differences between physical properties such as thermal expansion coefficients as the camera body cools. Such gaps are undesirable for the sake of appearance, and they create the danger of light leakage.

An object of the present invention is to eliminate the above-mentioned shortcomings in the prior art by providing a camera body of molded plastic with a metal plate inserted in the plastic body, the metal plate having at least one projection at each of its portions which connect to the plastic body where the projections contact the molding surface of the body mold in response to molding pressure, thereby preventing molten plastic from seeping into any clearance between the plate and the molding surface.

Another object of the present invention is to locate the connecting portions of the metal plate with the plastic body within planar regions of the camera body.

A further object of the present invention is to improve the adhesion of the metal plate to the plastic body by providing projections at edges of the connecting portions of the metal plate.

In accordance with the present invention, a camera body comprises a plastic body formed in a molding operation including a central portion, a film loading chamber and a film windup chamber each located at opposite ends of the central portion, and a metal plate fixed in the plastic body for reinforcing it, the metal plate having at least one connecting portion for interengaging with the plastic body. At least one projection extends from each connecting portion for contacting a molding surface in response to pressure applied to the projection when the camera body is molded to prevent seepage of molten plastic between the metal plate and the molding surface, thereby preventing formation of plastic flash.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described perferred embodiments of the invention.

DETAILED DESCRIPTION OF THE INVENTION

Figure 1:
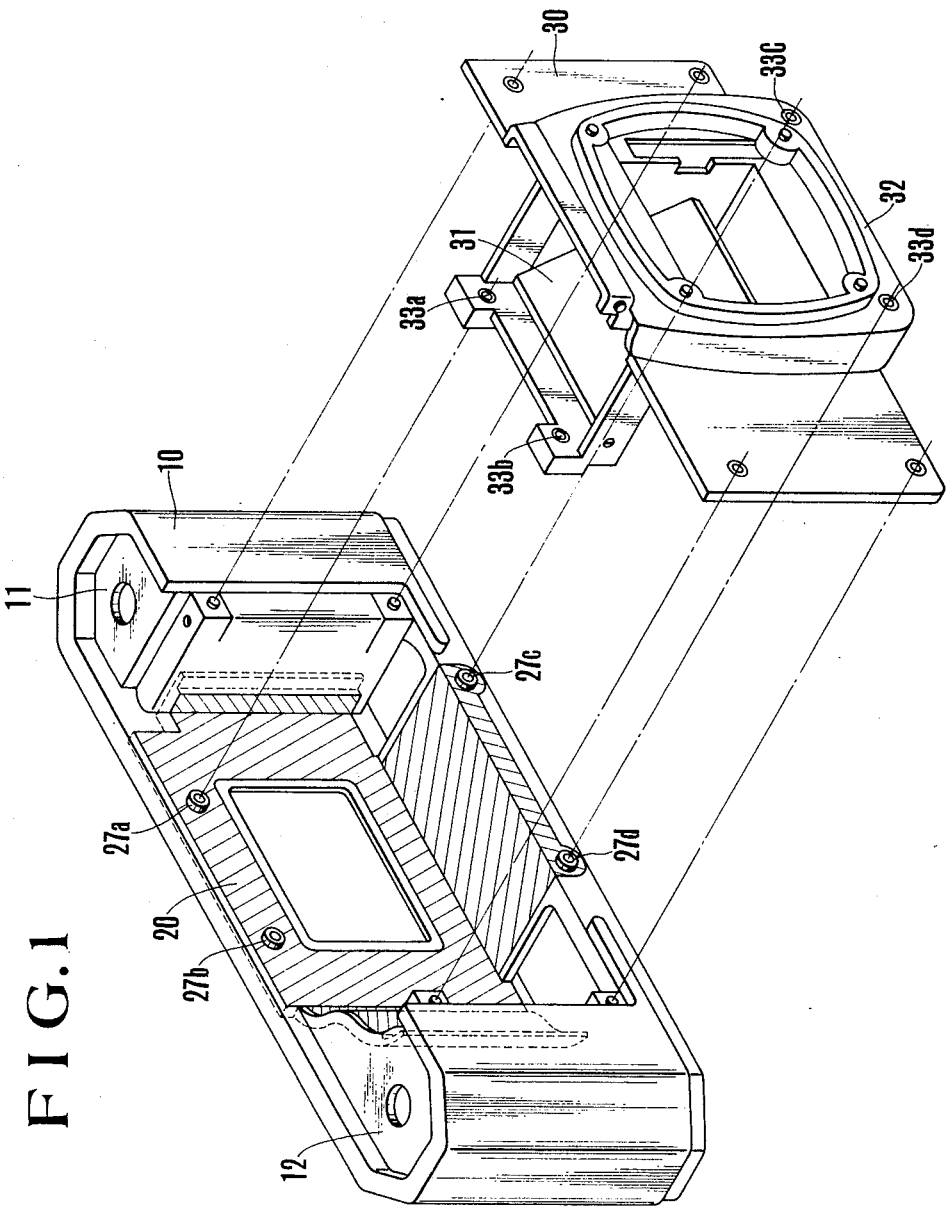
FIG. 1 is an exploded, perspective view of a camera body constructed in accordance with the present invention.

FIG. 1 shows a camera body 10 formed of molded plastic in such a manner that the camera body 10 is provided with a film loading chamber 11 and a film windup chamber 12 at opposite ends of a central body portion. A metal bracket or plate 20 made of, for example, aluminum, forms a part of the camera body which extends between the film loading chamber 11 and the film windup chamber 12. The plate is initially placed in a mold used for molding the camera body so that it interengages with and extends through the molded plastic. The thickness of the metal plate 20 is substantially equal to that of the portions of the plastic camera body which bound the plate. Specifically, the thickness of the metal plate 20 is equal to that of the plastic body where they extend in the film running plane, and of the bottom part of the body, between the film loading and windup chambers 11,12. Accordingly, the metal plate 20 has a rear surface which is exposed on the surface of the camera body 10, although only a forward facing surface of the metal plate 20 is indicated by the hatching lines in FIG. 1. It is therefore unavoidable that a connecting joint or seam between the plastic body 10 and the metal plate 20 be formed which can be visually recognized from outside the body.

Figure 2:
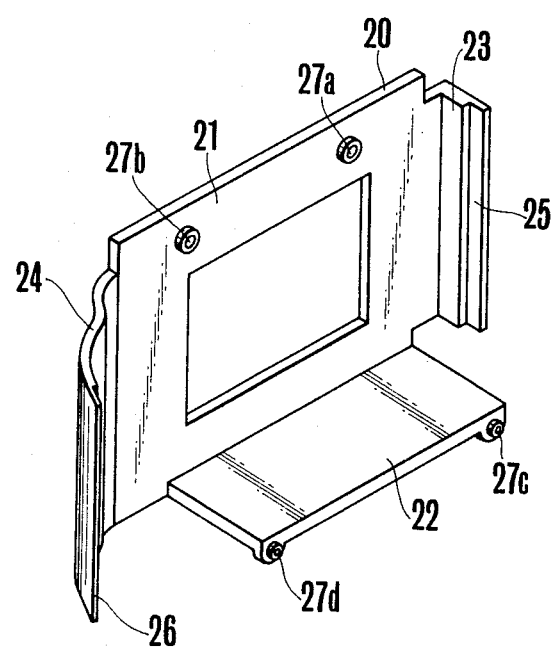
FIG. 2 is a perspective view of a metal plate forming a part of the camera body of FIG. 1.

As shown in FIG. 2, the metal plate includes a main wall 21 having an aperture therein, the rear surface of the main wall 21 extending in the plane of the film guide rail. The plate 20 also includes a bottom wall 22 extending normally to the main wall 21 and, as viewed in FIG. 1, right and left side walls 23 and 24. Side walls 23 and 24 are located so as to form a part of the film loading chamber 11 and the film windup chamber 12. The forwardly facing ends of the side walls 23,24 are provided with projections 25,26, respectively. Plate 20 further includes mounting seats 27a, 27b, 27c and 27d for locating a front plate unit 30 (FIG. 1). The front plate unit 30 is provided with a forward seat 32 in which a mirror 31 and a photographing lens mount are arranged. Front plate unit 30 also includes mounting parts 33a, 33b, 33c and 33d for engaging with the mounting seats 27a, 27b, 27c and 27d of the front plate unit 30 and metal plate 20, respectively, by way of screws so that the front plate unit 30 and metal plate 20 together maintain the flange back accurately positioned relative to the camera body.

Figure 3:
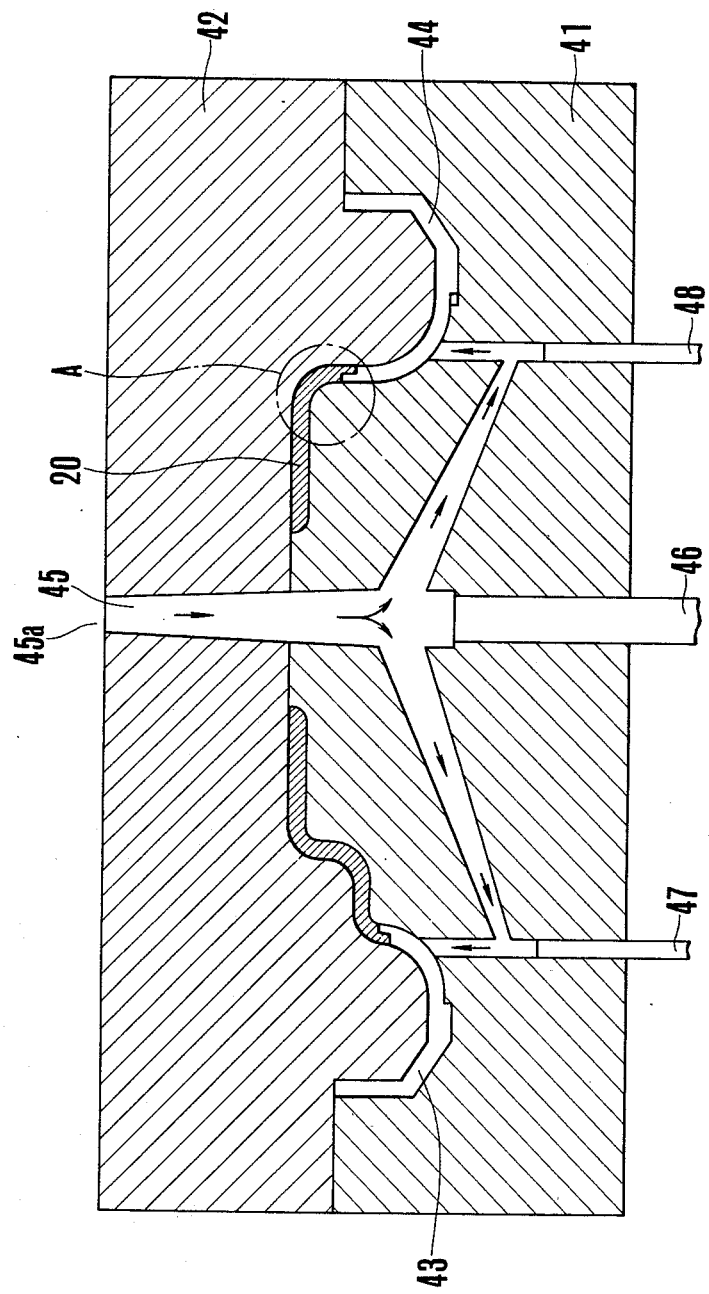
FIG. 3 is a sectional plan view of a mold for the camera body of FIG. 1.

FIG. 3 shows a mold used for forming the camera body of FIG. 1 from molten plastic, consisting of a male mold 41 and a female mold 42 closely fitted one into the other, as shown. A portion of the molding surfaces of the male mold 41 and the female mold 42 are formed to correspond to the forward and rear surfaces of the metal plate 20. The plate 20 is inserted between this portion of the molds while the remaining molding surfaces of the male mold 41 and the female mold 42 form cavities 43,44, into which molten plastic is charged. Since the metal plate 20 is inserted between the male and female molds 41,42, it is possible that a clearance exists between the plate 20 and the molding surfaces of the molds 41,42. Such a clearance would enable plastic burrs or flash to appear at the connecting portions of the metal plate 20 when the camera body is molded, thus making such a clearance undesirable especially if the plastic flash is visible from outside the camera body.

However, it is very difficult to maintain the dimensional tolerance for the metal plate within ±0.1 mm if the plate is made of aluminum, and one of a large group of molds is used for forming the metal plate, along with one of a large group of molds for the entire camera body. It is impossible to eliminate the occurrence of such dimensional differences when the molds in each group are interchanged among each other.

Further, it is usually necessary to provide relatively larger clearances in the mold for the curved portions of the camera body than for the planar portions, because of dimensional inaccuracies. It is therefore desirable that the connecting region between the metal plate 20 and the plastic body should be in the planar portion of the camera body so that mold clearances can be made as small as possible, the connecting region being located in the planar portion of the molded body immediately adjacent the locations at which the body surface is curved to house the film loading and film windup chambers. As shown in FIG. 3, the mold cavities 43,44 define spatial regions which enable the major portion of the film loading and film windup chambers to be formed when molten plastic is poured or injected into the cavities 43,44. It will be understood, however, that when the region at which the metal plate 20 connects with the plastic body portion is planar, the contact area between the plastic and the metal plate 20 is relatively small, so that clearances or gaps resulting from differences between the physical properties of the plastic and metal, such as their thermal coefficients of expansion, will tend to occur as the molded body cools.

Figure 4:
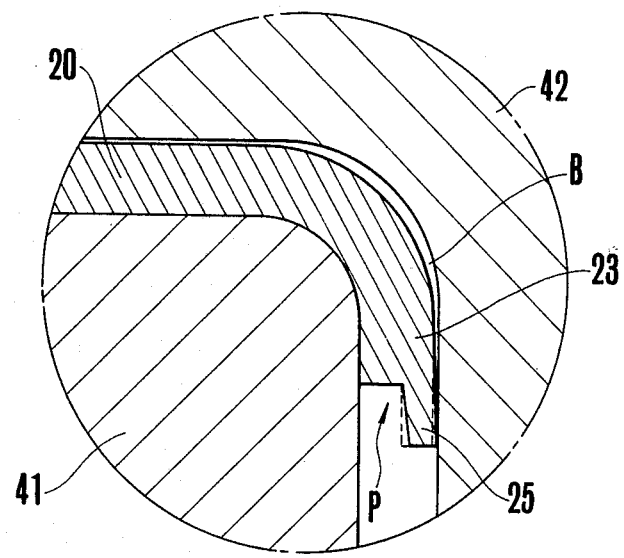
FIG. 4 is an enlarged detail view of a portion of the mold of FIG. 3 including a connecting portion of the metal plate.

In order to overcome the tendency for the metal plate 20 to separate from the plastic body, the connecting portion of the metal plate 20 is provided with a projection 25, as shown in FIG. 4, so as to increase the contact area between the metal plate 20 and the plastic body and thereby prevent the occurrence of clearances or gaps arising from differences in thermal coefficients of expansion between the metal and plastic.

Regarding the location of the projection 25 on the metal plate 20, there are two possibilities. First, the projection can be provided at the end of the metal plate 20 on the forward side of the plate which faces toward the camera lens mount, contrary to the location of projection 25 in FIG. 4. Second, the projection 25 can be located as in FIG. 4, on the rear side of the plate 20 which is visible when the camera back cover is opened. Although it appears more desirable to provide the projection on the side opposite to that shown in FIG. 4 to obtain adhesion from shrinkage of the plastic after the forming operation, it has been found that during the forming process, molten plastic enters into the clearance between the mold and the metal plate because the end of the plate provided with the projection is subjected to a forming pressure P. This results in the formation of plastic burrs or flash over the end of the plate 20, thereby causing the molded body to be unacceptable for use.

It has been discovered, however, that when the projection 25 is provided at the end of the metal plate 20 on the rear side thereof which is visible when the back cover is opened, the forming pressure P acts upon the projection 25 in such a manner that the projection is deformed outwardly by an amount sufficient to block the clearance B between the mold and the metal plate 20, as shown in FIG. 4, where the initial position of the projection 25 is shown in dotted lines. Accordingly, the rear surface of the metal plate is aligned with that of the plastic body so that no molten plastic can enter into the clearance B, thereby preventing formation of burrs or flash. Although, at this time, an internal stress will remain in the connecting portion of the metal plate 20 which has been deformed to obstruct the mold clearance, this has been found to cause no problems in practice when the molten plastic contains a sufficient amount of glass.

Referring again to FIG. 3, a runner or passageway 45 is provided through the molds 41,42 into which molten plastic is poured or injected by way of inlet 45a from an injection molding machine (not shown). Passageway 45 extends not only within the male mold 41, but also in the female mold 42. When the male mold 41 is properly located against the female mold 42, passageway 45 extends continuously through both molds, the inlet 45a being provided in the female mold 42, the passageway 45 being branched in the male mold 41 in such a manner that the ends of the branched passageways spaced from passageway 45 communicate with passageways extending parallel to main passageway 45 which then communicate with the mold cavities 43, 44. Ejector pins 46,47 and 48 are also provided as shown.

The formation of the camera body in accordance with the present invention will now be explained.

First, the metal plate 20 is placed against the molding surface of the male mold 41. Next, the female mold 42 is then fitted against the male mold 41. In this way, the plate 20 is held between the male mold 41 and the female mole 42, and the continuous passageway 45 through which molten plastic is injected into the cavities 43 and 44 is formed. When the inlet 45a of passageway 45 is connected with an injection molding machine, and the machine is operated, molten plastic is injected into the cavities 43, 44 through the passageway 45. When the molten plastic has filled the cavities 43, 44, the pressure P acts upon projections 25,26 on the connecting portions of the metal plate 20 in such a manner that projections 25,26 are deformed laterally toward the rear surface of the camera body by the amount B corresponding to the clearance between the mold and the metal plate 20. The projections move from the initial state shown in dotted lines in FIG. 4 to the position shown in solid lines wherein the rear surface of the metal plate 20 is aligned with that of the molten plastic within the mold, and formation of burrs or flash is prevented. After the molten plastic has filled the cavities 43,44 the male mold 41 and the female mold 42 are cooled and the plastic is solidified. At this time, stresses tend to form a clearance or gap between the connecting portion of the metal plate and the plastic body due to differences between the thermal coefficients of expansion of the plastic and the metal plate. The contact surface area of the metal plate 20 with the plastic is sufficiently large, owing to the projections 25,26, that the metal plate 20 nevertheless adheres to the plastic to prevent formation of such gaps. After the plastic solidifies, the female mold 42 is removed, and the metal plate 20 is withdrawn from the male mold 41 along with the plastic body by pushing the ejector pins 47, 48.

Figure 5:
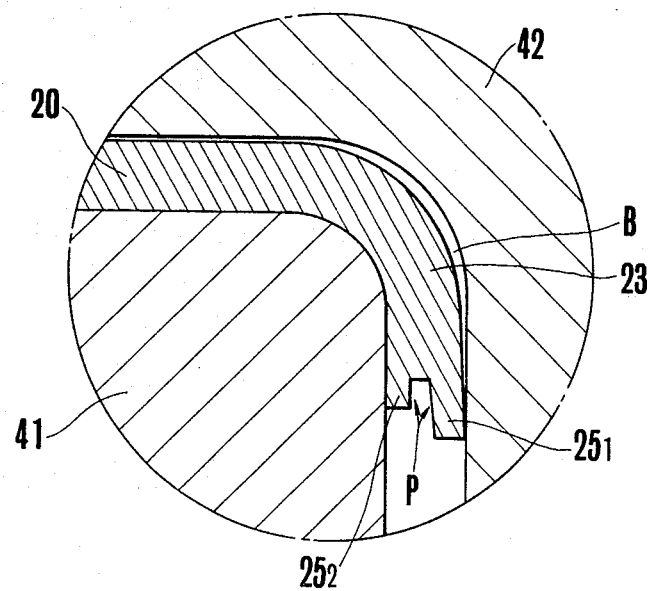
FIG. 5 is an enlarged detail view of the mold as in FIG. 4, showing a different embodiment for the connecting portion of the metal plate.
Figure 6:
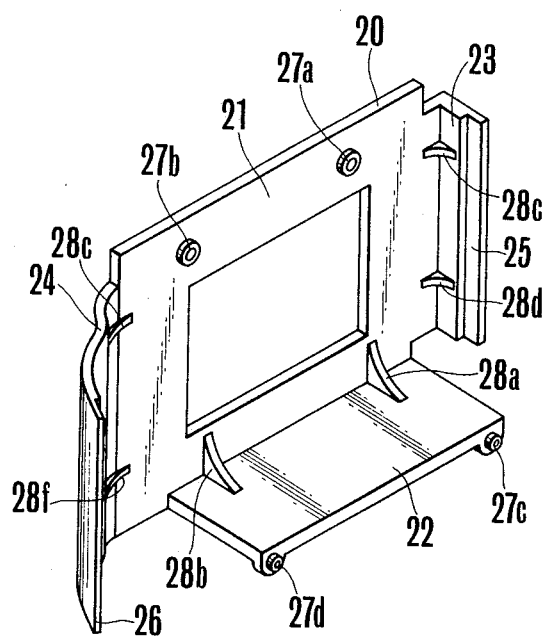
FIG. 6 is a perspective view of a second embodiment of the metal plate.

In the embodiment discussed above, at least one projection 25 is provided at the end of the connecting portions of the metal plate 20 with the plastic body, as shown in FIG. 4. FIG. 5 shows two projections $25_1$ and $25_2$ provided at the connecting portion of the metal plate 20 with the plastic body, projections $25_1$ and $25_2$ extending from both sides of the metal plate 20 to prevent plastic burrs or flash not only on the rear surface of the plate, but also on the forward surface of the plate. Further, by changing the relative length of the projections $25_1$, $25_2$, formation of burrs or flash on the visible rear surface of the plate 20 can be prevented, while at the same time, additional adherence strength between the metal plate and the plastic body can be obtained.

Additionally, the forms of the projections are not limited to those shown in FIGS. 4 and 5, but may also be tapered, or provided with a notch. Three or more projections may be provided at each connecting portion as long as there is no problem regarding strength of each projection. In this way, it is possible to improve the adhesion of the metal plate with the plastic body.

As shown in FIG. 2, the bottom wall 22, and the side walls 23, 24 of the metal plate 20 extend angularly from the central portion 21 of the plate 20. Consequently, if ribs 28a–28f are provided between the bottom wall 22 and side walls 23,24, and the central portion 21, all of the walls as well as the central portion 21 can be reinforced. When any one of the bottom wall 22 and side walls 23,24 are relatively small, that wall will more effectively resist pressure applied to the plate because of the provision of the ribs.

As has been explained above in detail, a projection is formed on the portion of a metal plate which connects with a plastic body of a camera, in accordance with the present invention. The projection is formed in such a manner that it is brought into contact with the surface of a camera body mold when molding pressure is applied to the projection as the camera body is molded. This movement of the projection prevents seepage of molten plastic into clearance between the metal plate and the mold which would otherwise form burrs or flash, while, at the same time, adhesion between the metal plate and the plastic is improved. Further, the region at which the metal plate connects with the plastic body is located on a planar part of the camera body so as to prevent further formation of plastic flash.

It is especially effective to improve the adhesion of the metal plate to the plastic body by providing projections on the connection portions of the metal plate since the plate is not completely embedded in the molded plastic camera body, and only the wall thickness of the metal plate can provide a connecting surface area with the plastic.

While specific embodiments of the invention have been shown and described in detail to illustrate the application of the inventive principles, it will be understood that the invention may be embodied otherwise without departing from such principles.

What is claimed is:
1. A camera body comprising:
a plastic body formed in a molding operation including a central body portion, and a film loading chamber and a film windup chamber each located at an opposite end of said central body portion;
a metal plate located in said central body portion and fixed thereat in the molding operation for reinforcing said central body portion, said metal plate having at least one portion for interengaging said plate with said molded plastic body, said metal plate being of a thickness substantially equal to that of said central body portion, said metal plate being exposed on an exterior surface of said camera body so that an exposed seam is formed between said metal plate and said molded plastic body; and
at least one projection formed along said connecting portion for interengagement with said molded plas- tic body, said projection being arranged to contact a forming mold surface in response to pressure applied to said projection when said camera body is molded to prevent seepage of the molten plastic between said metal plate and the forming mold surface thereby preventing formation of plastic flash.

2. A camera body according to claim 1, wherein the connecting portion of said metal plate with said plastic body is located at a planar part of the molded camera body.

3. A camera body according to claim 1, wherein said metal plate includes a main wall, a bottom wall extending normally to said main wall, a first side wall and a second side wall, said first side wall and said second side wall forming a part of said film loading chamber and said film windup chamber, said projection being formed at the ends of each of said first and second side walls facing forwardly of said central portion of said plastic body.

4. A camera body according to claim 1, wherein said metal plate includes a main wall and a lesser wall extending at a given angle to said main wall, and ribs extending between said main wall and said lesser wall for reinforcing said lesser wall.

5. A camera body comprising:
a plastic body formed in a molding operation including a central body portion, and a film loading chamber and a film windup chamber each located at an opposite end of said central body portion;
a metal plate located in said central body portion and fixed thereat in the molding operation for reinforcing said central body portion, said metal plate having at least one portion for interengaging said plate with said molded plastic body, said metal plate being of a thickness substantially equal to that of said central body portion, said metal plate being exposed on an exterior surface of said camera body so that an exposed seam is formed between said metal plate and said molded plastic body; and
a pair of projections formed at both ends of the connecting portion for interengagement of the metal block,
said projections each having predetermined length so as to be brought into contact with the surface of the mold by molding pressure during the molding operation so as to prevent seepage of the molten plastic into clearance between the metal block and the mold, thereby preventing plastic flash from appearing at the connecting portion of the plate with the plastic body.

6. A method of molding a camera body which comprises the steps of arranging a metal plate between portions of molding surfaces of a camera body mold, injecting molten plastic into cavities formed by the remaining portions of the molding surfaces so that the molten plastic flows against at least one projection arranged at a connecting portion of the metal plate which interengages the molded plastic, and deforming the projection against one of the molding surfaces to prevent the molten plastic from flowing past the connecting portion of the metal plate during the molding operation.

* * * * *